W. R. WILCOX.
Fruit-Baskets.
No. 144,376.          Patented Nov. 4, 1873.
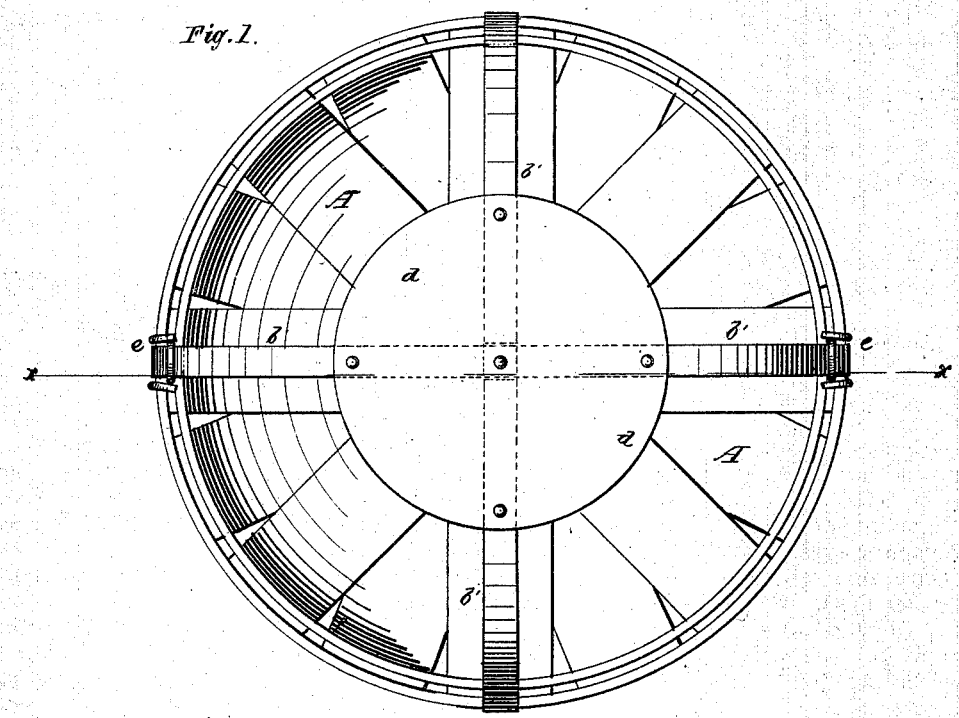
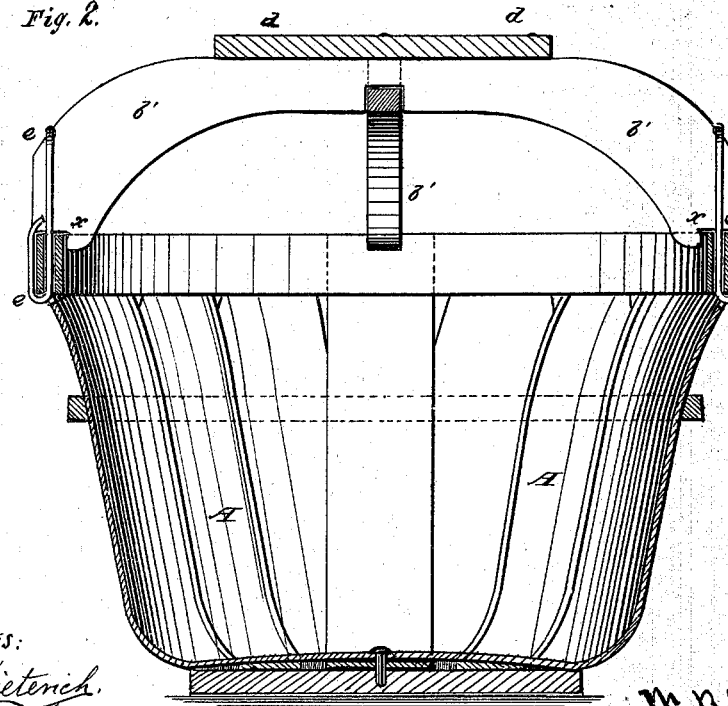

UNITED STATES PATENT OFFICE.

WILLIAM R. WILCOX, OF ST. JOSEPH, MICHIGAN, ASSIGNOR TO HIMSELF AND A. W. WELLS & CO., OF SAME PLACE.

IMPROVEMENT IN FRUIT-BASKETS.

Specification forming part of Letters Patent No. 144,376, dated November 4, 1873; application filed October 4, 1873.

*To all whom it may concern:*

Be it known that I, W. R. WILCOX, of St. Joseph, in the county of Berrien and State of Michigan, have invented certain new and useful Improvements in Fruit-Baskets; and I do hereby declare that the following is a full, clear, and exact description thereof, reference being had to the accompanying drawings and to the letters of reference marked thereon, which form a part of this specification, in which—

Figure 1 is a top view, and Fig. 2 a side view, of my fruit-protector attached to a basket.

The object of my invention is to afford protection to fruit when packed for shipment, and to facilitate transportation of the same. The nature of the invention consists in the peculiar construction of the protector, as will be hereinafter fully set forth.

To enable others skilled in the art to make and use my device, I will now proceed to describe its construction and operation.

A represents a basket, which may be of the usual construction for such purposes. $b\ b'$ are two supports, standing edgewise, and let into each other at their centers, in the position shown in the drawings. $d$ is a circular top, of about three or four inches in diameter, secured to the top of the supports.

I do not regard the top $d$ as absolutely essential, as the supports are flattened, as seen in Fig. 2, which will admit of the top basket resting firmly upon the "protector" of the lower basket.

The ends of the supports $b\ b'$ are notched, as shown at $x$, Fig. 2, so that they may rest squarely on the rim. $e\ e$ are wires, which bind or secure the protector to the basket.

It will thus be observed that, when the protector is once in place, it will be unnecessary to remove it, either to fill or unpack the basket. The special advantage, however, is that the baskets may be placed one on top of the other, and thus shipped without damage to the fruit.

Having thus described my invention, what I claim, and desire to secure by Letters Patent, is—

The supports $b\ b'$, constructed and arranged as described, in combination with a fruit basket or box, and secured thereto by wires $e\ e$, substantially as set forth.

In testimony that I claim the foregoing as my own I affix my signature in presence of two witnesses.

WILLIAM R. WILCOX.

Witnesses:
JOSEPH W. BREWER,
MARTIN LORSCHER.